(12) United States Patent
Ross et al.

(10) Patent No.: US 12,417,079 B2
(45) Date of Patent: Sep. 16, 2025

(54) INTERACTIVE EDITING OF A MACHINE-GENERATED DOCUMENT

(71) Applicant: International Business Machines Corporation, Armonk, NY (US)

(72) Inventors: Steven I. Ross, S. Hamilton, MA (US); Stephanie Houde, Belmont, MA (US); Fernando Carlos Martinez, Buenos Aires (AR)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 18/047,683

(22) Filed: Oct. 19, 2022

(65) Prior Publication Data

US 2024/0134611 A1   Apr. 25, 2024
US 2024/0231763 A9   Jul. 11, 2024

(51) Int. Cl.
*G06F 9/44*       (2018.01)
*G06F 8/33*       (2018.01)

(52) U.S. Cl.
CPC ..................... *G06F 8/33* (2013.01)

(58) Field of Classification Search
None
See application file for complete search history.

(56) References Cited

U.S. PATENT DOCUMENTS

| | | |
|---|---|---|
| 5,067,166 A | 11/1991 | Ito |
| 6,847,979 B2 | 1/2005 | Allemang et al. |
| 7,698,124 B2 | 4/2010 | Menezes et al. |
| 8,374,979 B2 | 2/2013 | Zhou et al. |
| 9,015,680 B1 | 4/2015 | Shropshire |
| 9,063,949 B2 | 6/2015 | Zhai et al. |
| 9,760,542 B1 | 9/2017 | Lai et al. |

(Continued)

FOREIGN PATENT DOCUMENTS

| | | |
|---|---|---|
| CN | 111985220 A | 11/2020 |
| CN | 113947072 A | 1/2022 |

OTHER PUBLICATIONS

Lee eat al., IntelliCAT: Intelligent Machine Translation Post-Editing with Quality Estimation and Translation Suggestion (Year: 2021).*

(Continued)

*Primary Examiner* — Insun Kang
(74) *Attorney, Agent, or Firm* — CANTOR COLBURN LLP; Robert Bean

(57) ABSTRACT

Embodiments relate to interactive editing of a machine-generated document. A computer-implemented method includes receiving, by a processor, a machine-generated document and performing a comparison of a current state of the machine-generated document to a previous state. A user edit is identified as one or more user-replaced tokens of a previous token sequence based at least in part on the comparison. A new version of the machine-generated document is generated that includes the one or more user-replaced tokens and identifies one or more related tokens to replace with a suggested replacement token sequence associated with the one or more user-replaced tokens. A suggestion list is generated for display to the user in a graphical user interface to indicate the suggested replacement token sequence to replace the one or more related tokens.

12 Claims, 10 Drawing Sheets

(56) References Cited

U.S. PATENT DOCUMENTS

| | | | |
|---|---|---|---|
| 10,713,432 | B2 | 7/2020 | Goyal et al. |
| 11,262,984 | B2* | 3/2022 | Svyatkovskiy .......... G06N 5/04 |
| 11,748,555 | B2* | 9/2023 | Tran ...................... G06N 20/00 |
| | | | 715/202 |
| 12,014,155 | B2* | 6/2024 | Athiwaratkun ........... G06F 8/33 |
| 2007/0130563 | A1 | 6/2007 | Elgazzar et al. |
| 2013/0268511 | A1 | 10/2013 | Bailey et al. |
| 2014/0136497 | A1 | 5/2014 | Georgiev et al. |
| 2015/0051896 | A1 | 2/2015 | Simard et al. |
| 2015/0136497 | A1 | 5/2015 | Morin |
| 2015/0242932 | A1 | 8/2015 | Beguin et al. |
| 2017/0161264 | A1 | 6/2017 | Zhao et al. |
| 2017/0169346 | A1 | 6/2017 | Rinkus |
| 2017/0192950 | A1* | 7/2017 | Gaither ................... G10L 15/22 |
| 2017/0220535 | A1 | 8/2017 | Olsen et al. |
| 2018/0308583 | A1 | 10/2018 | Yegnanarayanan |
| 2020/0086760 | A1 | 3/2020 | Rini |
| 2020/0097261 | A1* | 3/2020 | Smith ................... G06F 40/174 |
| 2020/0272443 | A1* | 8/2020 | Fu ........................... G06F 18/28 |
| 2021/0042475 | A1 | 2/2021 | Zhang et al. |
| 2022/0157315 | A1* | 5/2022 | Raux ....................... G06F 3/167 |
| 2022/0188646 | A1* | 6/2022 | Ramesh .............. G06F 18/2193 |
| 2022/0222047 | A1* | 7/2022 | Todirel ....................... G06F 8/70 |
| 2023/0068394 | A1* | 3/2023 | Choudhury ............ G06N 3/044 |
| 2023/0088175 | A1 | 3/2023 | Ross et al. |
| 2023/0305690 | A1* | 9/2023 | Brdiczka ............. G06F 3/04842 |
| 2023/0325164 | A1* | 10/2023 | Singh ................ G06F 18/23213 |
| | | | 717/137 |
| 2024/0004623 | A1* | 1/2024 | Groenewegen ........... G06F 8/42 |

OTHER PUBLICATIONS

Chakraborty, CODIT: Code Editing with Tree-Based Neural Models (Year: 2022).*

Chen et al., "By the Community & for the Community: A Deep Learning Approach to Assist Collaborative Editing in Q&A Sites," Proceedings of the ACM on Human-Computer Interaction 1.CSCW (2017): 1-21.

Chen, "Nonlinear Revision Control for Images", ACM Transactions on Graphics, vol. 30, Issue 4, Jul. 2011, 10 pages.

Diffuse, [online]; [retrieved on Sep. 3, 2021]; retrieved from the Internethttp://diffuse.sourceforge.net/.

Falleri, "Fine-grained and Accurate Source Code Differencing"; ASE'14, Sep. 15-19, 2014; 12 pages.

Weisz, "Perfection Not Required? Human-AI Partnerships in Code Translation", Proceedings of 26th International Conference on Intelligent User Interfaces (IUI '21). ACM, New York, NY; Apr. 8, 2021, 18 pages.

Hata et al., "Learning to generate corrective patches using neural machine translation," Journal of Latex Class Files, vol. 14, No. 8, Aug. 2015, 20 pages.

Lachaux et al., "Unsupervised Translation of Programming Languages", Sep. 22, 2020, 21 pages.

Li et al., "MISS: An Assistant for Multi-Style Simultaneous Translation," Proceedings of the 2021 Conference on Empirical Methods in Natural Language Processing: System Demonstrations, 2021, pp. 1-10.

Mesbah et al., "DeepDelta: Learning to Repair Compilation Errors," Proceedings of the 2019 27th ACM Joint Meeting on European Software Engineering Conference and Symposium on the Foundations of Software Engineering (ESEC/FSE '19), 2019, ACM, 12 pages.

Myers, "An O(ND) Difference Algorithm and Its Variations"; National Science Foundation; 1986; 15 pages.

Vaswani et al., "Attention Is All You Need", 31st Conference on Neural Information Processing Systems (NIPS 2017), 15 pages.

Whitaker, "Understanding Changes in n-way Merge: Use-cases and User Interface Demonstrations", DChanges 'Sep. 14, 16 2014, 4 pages.

Yoon, "Supporting Selective Undo in a Code Editor", 2015 IEEE/ACM 37th IEEE International Conference on Software Engineering, May 16-24, 2015, 11 pages.

Ross, et al., "Interactive Graphical Display of Multiple Overlapping Hypotheses or Document Versions", U.S. Appl. No. 17/482,536, filed Sep. 23, 2021.

IBM: List of IBM Patents or Patent Applications Treated as Related (Appendix P); Date Filed: Oct. 19, 2022; 2 pages.

* cited by examiner

Code Translator

Python Result

```
1  def two_sum ( nums , target ) :
2    """
3    From Leet . com 1 - Pass Solution
4
5    Given an array of integers, return indices of the two
6    numbers such that they add up to a specific target .
7
8    You may assume that each input would have exactly one
9    solution, and you may not use the same element twice .
10
11   : param nums :
12   : param target :
13   : return :
14   """
15   d = {}
16   for i in nums :
17       complement = target - i
18       if d.has_key ( complement ) :
19           return [ d [ complement ] , i ]
20       d [ i ] = i
21   raise ValueError ( "No two sum solution ")
```

```
Code Translator
  Python Result
 1  def two_sum ( nums , target ) :
 2    """
 3    From Leet . com 1 - Pass Solution
 4
 5    Given an array of integers, return indices of the two
 6    numbers such that they add up to a specific target .
 7
 8    You may assume that each input would have exactly one
 9    solution, and you may not use the same element twice .
10
11    : param nums :
12    : param target :
13    : return :
14    """
15    d = {}
16    for i in ( range ( len ( nums ) ) ) :
17        complement = target - i
18        if d.has_key ( complement ) :
19            return [ d [ complement ] , i ]
20        d [ i ] = i
21    raise ValueError ( "No two sum solution ")
```

Code Translator

Python Result

```
 1  def two_sum(nums, target):
 2      """
 3      From Leet.com 1 - Pass Solution
 4
 5      Given an array of integers, return indices of the two
 6      numbers such that they add up to a specific target.
 7
 8      You may assume that each input would have exactly one
 9      solution, and you may not use the same element twice.
10
11      :param nums:
12      :param target:
13      :return:
14      """
15      d = {}
16      for i in range(len(nums)[:]):
17          complement = target - i
18          if d.has_key(complement):
19              return [d[complement], i]
20          d[i] = nums[i]
21      raise ValueError("No two sum solution")
```

AI Comments and Suggestions

*Because of this update:*
(range(len(nums)))

*these related updates are suggested:*

☑ i -> nums[i]
☑ i -> nums[i]

FIG. 9

Code Translator

Python Result

```
1   def two_sum ( nums , target ) :
2     """
3     From Leet . com 1 - Pass Solution
4
5     Given an array of integers, return indices of the two
6     numbers such that they add up to a specific target .
7
8     You may assume that each input would have exactly one
9     solution, and you may not use the same element twice .
10
11    : param nums :
12    : param target :
13    : return :
14    """
15      d = {}
16      for i in ( range (len ( nums ) ) :
17         complement = target - nums[i]
18         if d.has_key ( complement ) :
19            return [ d [ complement ] , i ]
20         d [ nums[i] ] = i
21      raise ValueError ( "No two sum solution ")
```

FIG. 10

INTERACTIVE EDITING OF A MACHINE-GENERATED DOCUMENT

BACKGROUND

The present invention generally relates to computer systems, and more specifically, to computer-implemented methods, computer systems, and computer program products configured and arranged for interactive editing of a machine-generated document.

A variety of computerized applications, particularly those involving machine intelligence, may generate one or more possible alternative solutions in the course of performing their processing. This is particularly common in applications such as speech recognition, language translation, and other deep learning applications, but can arise with other generative solutions as well. A transformer model can generate natural language text, perform translation between text and natural languages, or translate programs between programming languages. The transformer model typically executes once to produce one or more output products. It is then up to the user to select a preferred output product and make edits to create a final version that is acceptable. Machine generation of documents in general can result in an output that a user may desire to update further for various reasons.

SUMMARY

Embodiments of the present invention are directed to computer-implemented methods for interactive editing of a machine-generated document. A non-limiting example computer-implemented method includes receiving, by a processor, a machine-generated document and performing a comparison of a current state of the machine-generated document to a previous state. A user edit is identified as one or more user-replaced tokens of a previous token sequence based at least in part on the comparison. A new version of the machine-generated document is generated that includes the one or more user-replaced tokens and identifies one or more related tokens to replace with a suggested replacement token sequence associated with the one or more user-replaced tokens. A suggestion list is generated for display to the user in a graphical user interface to indicate the suggested replacement token sequence to replace the one or more related tokens.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 7 depicts a user interface highlighting text in a machine-generated document to be updated by a user according to one or more embodiments of the present invention;

FIG. 8 depicts a user interface highlighting a user-made update to text in a machine-generated document during an editing session according to one or more embodiments of the present invention;

FIG. 9 depicts a user interface presenting a suggestion list of replacement locations of related tokens to be replaced based on a user-made update of a previous token according to one or more embodiments of the present invention; and FIG. 10 depicts a user interface highlighting accepted suggestions according to one or more embodiments of the present invention.

DETAILED DESCRIPTION

Figure 1:
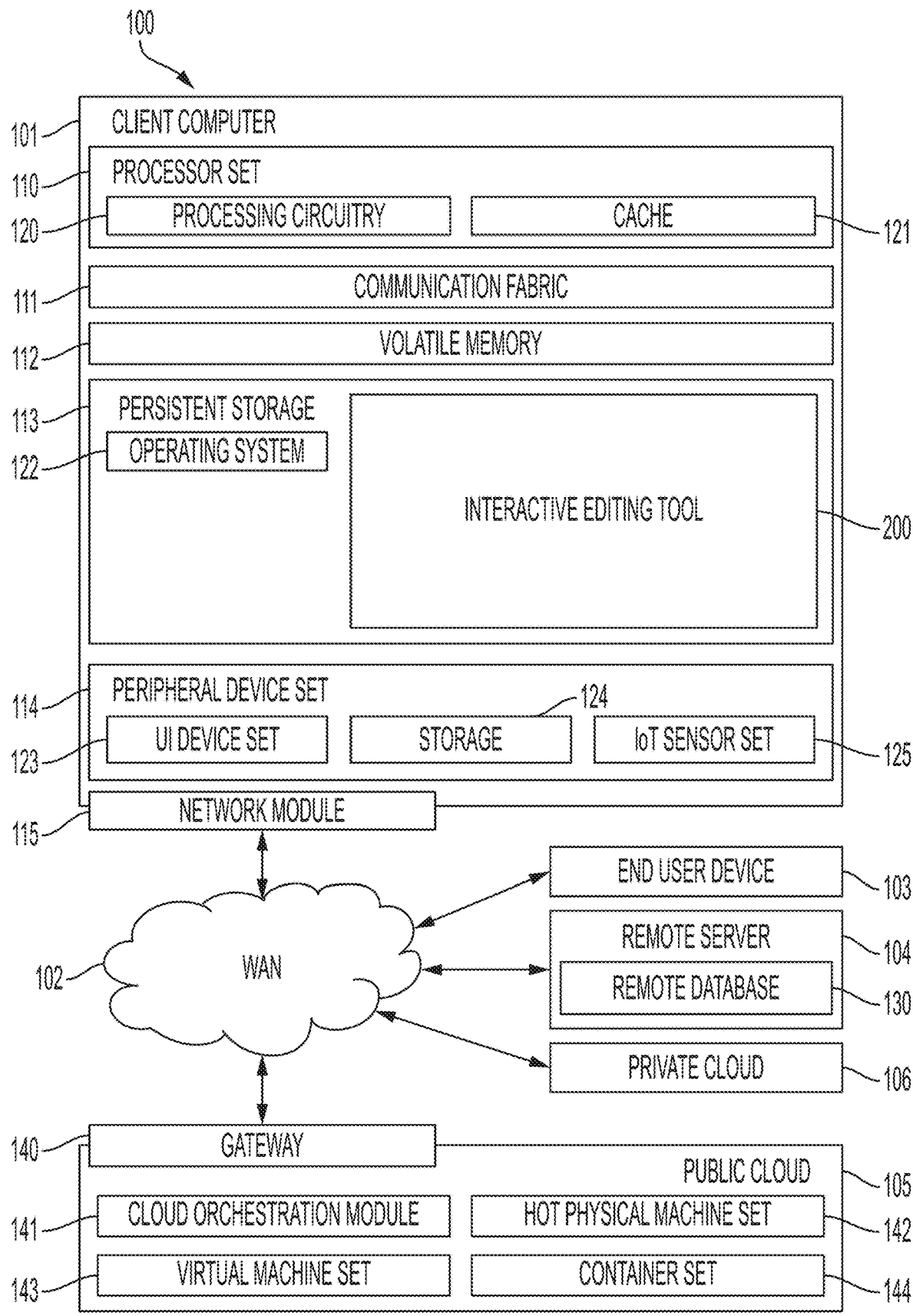
FIG. 1 depicts a block diagram of an example computing environment for use in conjunction with one or more embodiments of the present invention.

Recently, generative techniques have been applied to the realm of software engineering. Leveraging the naturalness hypothesis, code is a form of human communication with similar statistical properties as natural languages. New progress in neural machine translation (NMT) has demonstrated how unsupervised learning techniques can be used to train models that transform source code from one programming language to another. However, code is unique compared to natural languages. For example, code is much more brittle, and swapping even a few characters or tokens can completely change its meaning or effect. In addition, code demands a certain level of correctness. For example, code either compiles or does not, and it is either correct or contains bugs such as logic errors, security flaws, etc. Code translation output, along with other types of machine-generated documents, may need to be further edited by a user to correct errors in translation or other types of generative output. When edits are made to a machine-generated document, the changes may result in consequences in other portions of the machine-generated document to maintain consistency or correctness. For instance, in the context of code, an edit may impact other portions of code to maintain functionality of the code. However, the impact of such changes may not be readily apparent to the user, particularly where a large corpus is involved.

Embodiments of the invention address the above-described shortcomings by providing computer-implemented methods, computer systems, and computer program products arranged and configured for interactive editing of a machine-generated document. By keeping a generative model involved after one or more edits are made to a machine-generated document, the impact of the edits can be taken into account to generate one or more suggested additional changes to the machine-generated document as a consequence of the edits. For purposes of illustration and explanation, some example scenarios disclose an application of one or more embodiments of the invention in the processing and presentation of results of automatic translation of computer programs from one computer language to another. One or more embodiments provide a graphical user interface in which a user can edit a machine-generated document, such as the output of a translator, to make corrections and updates. Upon making one or more updates through an interactive editing tool, the updates can be identified as user-replaced tokens of previous tokens. Rather than making the user manually determine the impact of the updates to other portions of the machine-generated document, embodiments can trigger automated generation of a new version of the machine-generated document that replaces one or more related tokens with a replacement token associated with the user-replaced token. The user can be prompted to ensure that the suggested updates are acceptable before the machine-generated document is updated to align with the new version of the machine-generated document. Accordingly, in accordance with one or more embodiments, users can make edits to the resulting machine-generated document from a translator and the edits can trigger analysis for other possible related changes that should be made to align with the edits. A graphical user interface can illustrate/highlight locations in the machine-generated document where the related changes should be made along with the suggested change, according to one or more embodiments of the invention.

Various technical benefits and technical solutions are provided by providing suggested changes to a machine-generated document in response to user-initiated editing. In the context of software development, as noted herein, source code demands a certain level of correctness because code either compiles or does not, is either correct or contains bugs such as logic errors, security flaws, etc., which can cause computer problems when the translated/transcoded source code is compiled or executed by the computer system. When a translator/transcoder coverts source code from one programming language like Java, C++, and Python to another for execution by a computer system, there can be differences among the hypotheses or versions of the translated document. One of the versions of the translation, such as the most confident hypothesis/version of the translated document, can be selected for further editing as a machine-generated document for further updating. Where a user identifies that a portion of the machine-generated document should change, for instance, to correct a source code translation error, the change may have a propagation effect that extends beyond simple text matching. Embodiments of the invention are therefore a technical solution to a technical problem. Further, in the context of source code translation, by ensuring that the final version of the translated source code has been analyzed in view of edits in one or more embodiments of the invention, the improved translated source code can prevent or mitigate potential problems when translated code is executed. Accordingly, by novel techniques used in aspects of the invention, the functioning of the computer system itself is improved, as well as the functioning of multiple computer systems interconnected in a cloud environment, all of which can prevent potential exposure to a future or present computer issue.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as an interactive editing tool 200 (also referred to as block 200) for a machine-generated document. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
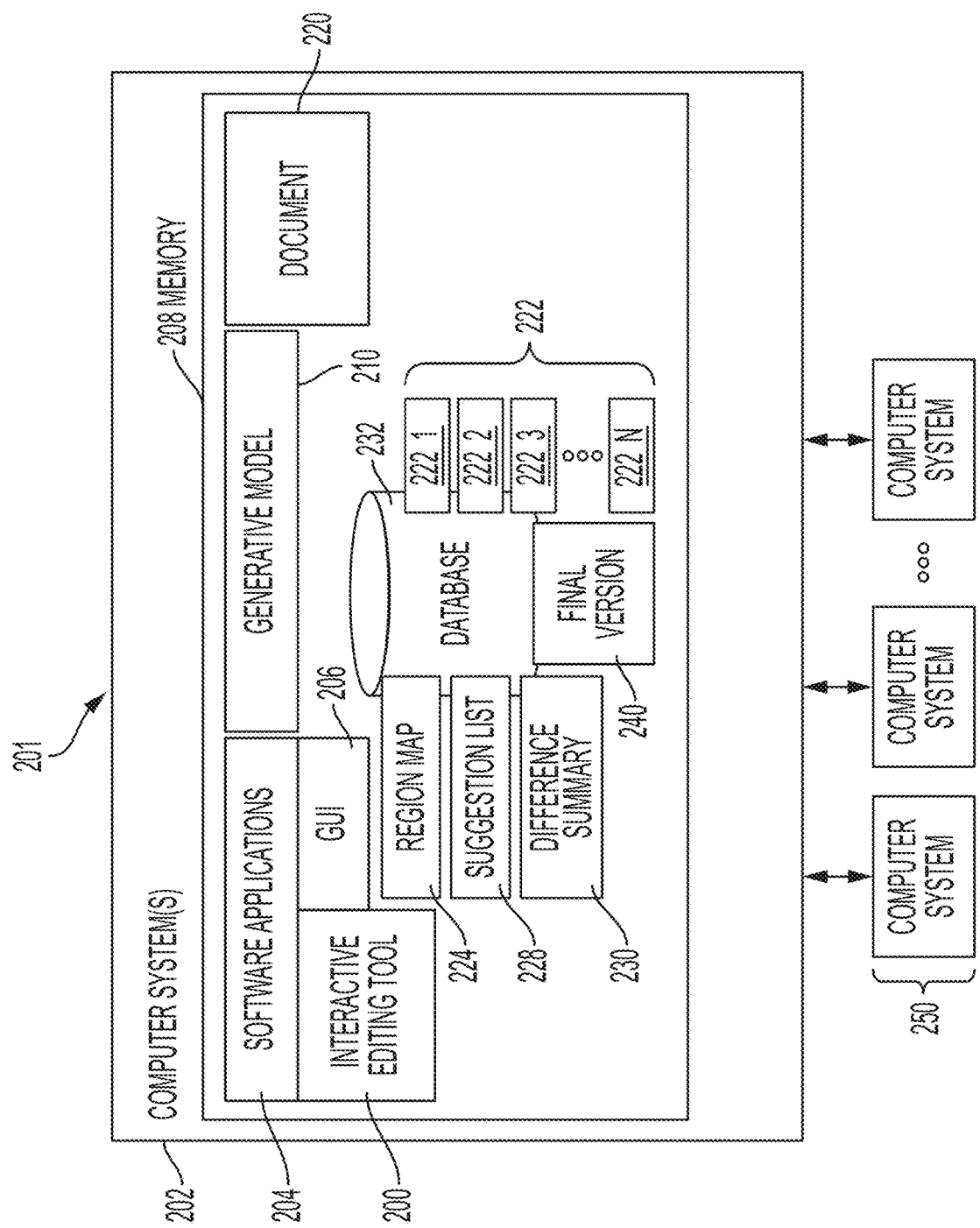
FIG. 2 depicts a block diagram of an example computing environment which is configured to perform interactive editing of a machine-generated document according to one or more embodiments of the present invention.

FIG. 2 is a block diagram of an example computing environment 201 which is configured to provide interactive editing of a machine-generated document according to one or more embodiments of the inventions. Computing environment 201 can include computer system(s) 202 and computer systems 250, which may include any of the hardware and software components and functionality discussed in computing environment 100 of FIG. 1. Similarly, software applications 204 of computer system 202 may include functionality for execution/processing on processor set 110 to operate and function according to one or more embodiments discussed herein, such as interactive editing tool 200. Additionally, computer system 202 may include one or more processors, such as processor set 110 of FIG. 1, and memory 208. Memory 208 can include and/or be representative of any type of storage, system memory, hard disk, etc., discussed herein. Computing environment 201 may be representative of one or more portions of a cloud computing environment. Functions of computing environment 201 can use and/or be implemented in workloads of a workload layer and any of components of a hardware and software layer.

Figure 3:
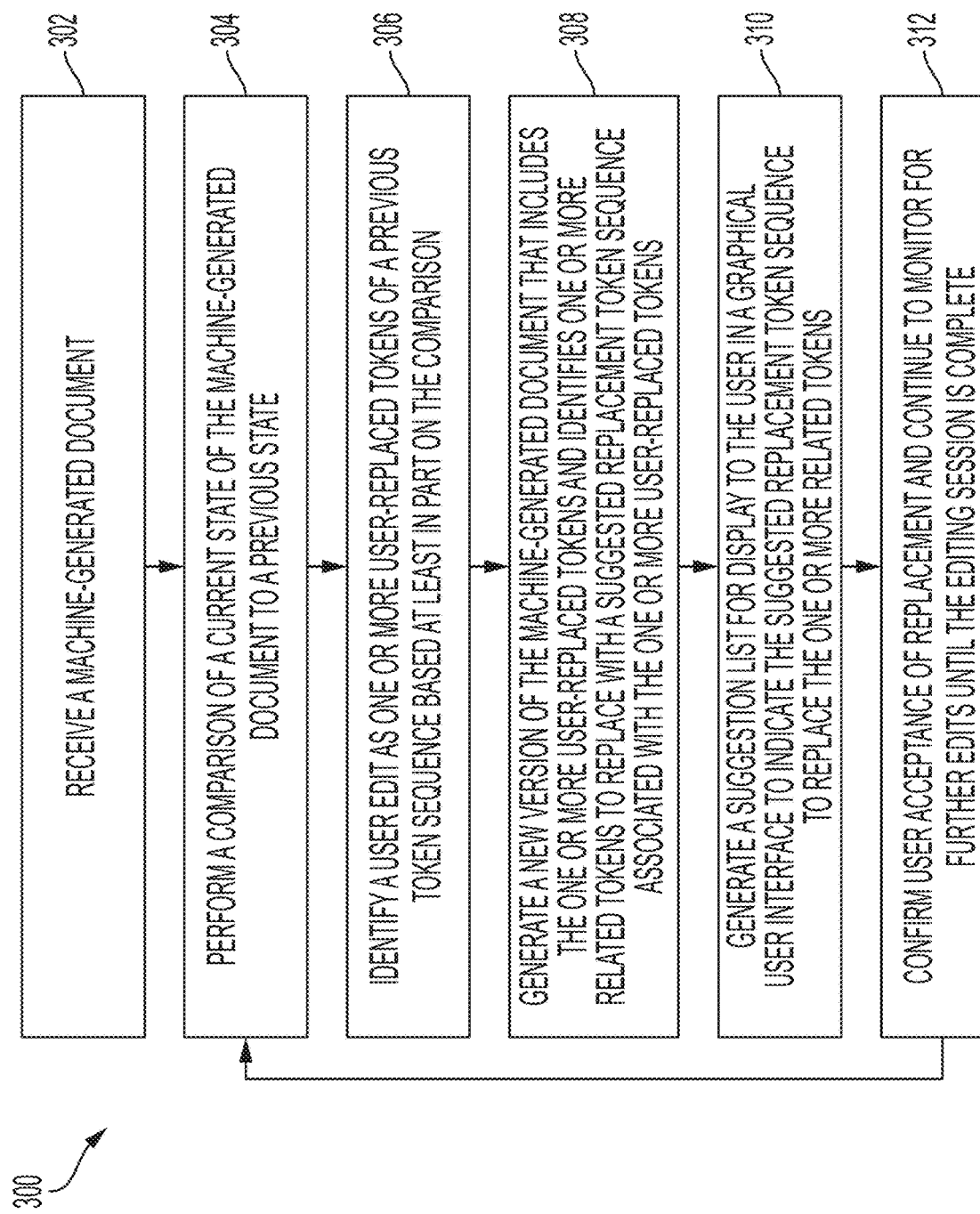
FIG. 3 is a flowchart of a computer-implemented process for interactive editing of a machine-generated document according to one or more embodiments of the present invention.

FIG. 3 is a flowchart of a computer-implemented process 300 for interactive editing of a machine-generated document in accordance with one or more embodiments. Computer-implemented process 300 can be executed by computer system 202 in FIG. 2 as further described herein.

At block 302 of computer-implemented process 300, a software application 204 executing on computer system 202, such as interactive editing tool 200, can receive a machine-generated document. The machine-generated document can be generated using the generative model 210 based at least in part on a document 220. Document 220 may be stored in memory 208. A software application 204 may receive and/or request document 220 from one of the computer systems 250. Document 220 can contain data in one format that is to be converted to another, different format that is usable by a computer system. For explanation purposes, document 220 can be a file, such as a computer-executable file, which contains source code in a first programming language that is to be converted to a second program language different from the first programming language, where the first programming language and the second programming language are configured to be executed by a processor. Document 220 is utilized for explanation purposes and ease of understanding, and it should be appreciated that one or more embodiments of the invention are not meant to be limited. In one or more embodiments, document 220 may refer to a general input and/or a request to a generative system. The input to the generative system may include natural language descriptions, data, sensor readings, computer code, a chemical formula, a diagram, natural speech, an image, etc. Additional examples of input to the generative system may include speech recognition (e.g., translation of audio input to text), musical transcription (e.g., translation of audio input to musical notation), natural language translation, and other forms of text generation. Although example scenarios may use the output side as a textual output, it should be recognized that one or more embodiments could have an output of more than a textual output in which differences can be computed over; the output can be segmented into regions where the corresponding regions are established in different alternatives as discussed further herein. The output can include natural language descriptions, data, sensor readings, computer code, a chemical formula, a diagram, natural speech, an image, etc.

The software application 204 can be configured to translate/transcode/generate document 220 from a first format to a second format using the generative model 210, and this conversion can result in a single or multiple different machine-generated documents 222_1, 222_2, 222_3, through 222_N, where N represents the number of the multiple documents. Multiple machine-generated documents 222_1, 222_2, 222_3, through 222_N can be generally referred to as machine-generated documents 222. Machine-generated documents 222 can be multiple hypotheses and/or versions of document 220 which has been translated from, for example, the first programming language to the second programming language, where each machine-generated document 222 is different and/or a different version of the output resulting from translating/transcoding the same document 220 or other source material. For explanation purposes, where multiple documents are generated, the software application 204 can determine that machine-generated document 222_1 has the highest confidence in translation to the second programing language, which may use any standard criteria for determining the confidence, such as a confidence score. Accordingly, the other machine-generated documents 222_2 through 222_N may have a lower confidence. The original document 220 may be a first programming language document for instance, and the multiple machine-generated documents 222 could all be second programming language documents. Multiple machine-generated documents 222 can be different versions of/from each other; lower confidence machine-generated documents 222_2 through 222_N are different versions of the highest confidence machine-generated document 222_1. Thus, a machine-generated document 222 can be a translation of a corpus in a language from a first representation to a second representation by a generative model, such as the generative model 210.

Software application 204 may call and/or employ a standard translation/transcoding program or generative model to translate document 220 from the first programming language to the second programming language. For example, software application 204 may use a transcoding/translation model as the generative model 210. The generative model 210 can be a trained model that uses machine learning or other approaches to perform document generation. Where the generative model 210 is a transcoding/translation model, the generative model 210 can include the functionality of transcoders as understood by one of ordinary skill in the art, such as but not limited to a transcoder which for unsupervised neural machine translation (NMT) as understood by one of ordinary skill in the art. Although generative model 210 is described in terms of a transcoding/translation model, any type of generative system/model can be used. The generative model 210 can include an algorithm, a rule-based system, and/or any other form of intelligent generative system capable of producing one or more versions of output for consideration.

Figure 4:
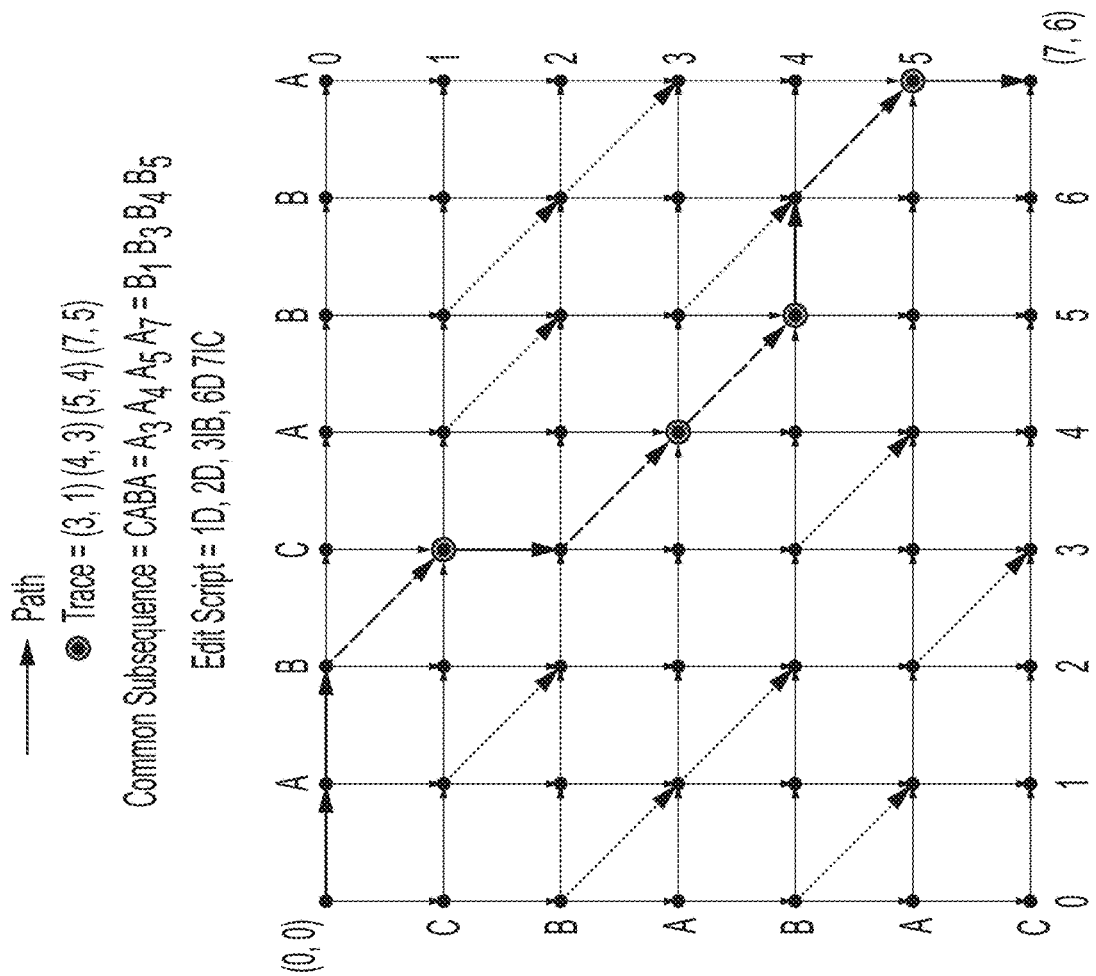
FIG. 4 depicts a block diagram of detecting differences using a dynamic programming difference computation according to one or more embodiments of the present invention.

A machine-generated document, such as machine-generated document 222_1, can be edited by a user of the interactive editing tool 200 during an editing session. At block 304, the interactive editing tool 200 can perform or trigger software application 204 to perform a comparison of a current state of the machine-generated document to a previous state. As one example, software application 204 may perform and/or call one or more other software applications to perform a pairwise comparison between the edited version of the machine-generated document 222_1 and a previous version of the machine-generated document 222_1 to determine each of the differences in one or more edited portions of the machine-generated document 222_1. Software application 204 may use and/or employ standard comparison algorithms, as understood by one of ordinary skill in the art. As depicted in FIG. 4, software application 204 may use and/or employ Myers's algorithm to separately compare the current version of the machine-generated document 222_1 to the previous version of the machine-generated documents 222_1. As seen in FIG. 4, software application 204 is configured to compute a difference path, which is a series of insertions and deletions that convert the reference version (e.g., previous version of the machine-generated document 222_1) into the current version. In one or more embodiments, software application 204 can use the Myer's algorithm to compute the least-cost sequence of insertions and deletions to convert the string of characters or tokens across the top to the string of characters or tokens on the left, although other algorithms could be utilized. In the example in FIG. 4, this illustration is converting the character sequence "ABCABBA" to "CBABAC". There are many different sequences of insertions and deletions that could achieve this transformation, but if it is established that each insertion and deletion has a constant cost associated with it, then some sequences are more expensive than others. Each sequence is represented by a path through the matrix. For example, one approach could delete all the characters in the first string, and then insert all the characters in the second string. That would be the path that runs along the top and then down the right hand side and would cost 13 assuming a cost of 1 for each insertion or deletion. The least cost path in this case, only requires 3 deletions and 2 insertions, for a cost of 5. Diagonal traversals take advantage of commonality between the source and target strings, resulting in 0 incremental cost. Myer's algorithm computes this least-cost path, as shown in the diagram.

Figure 5:
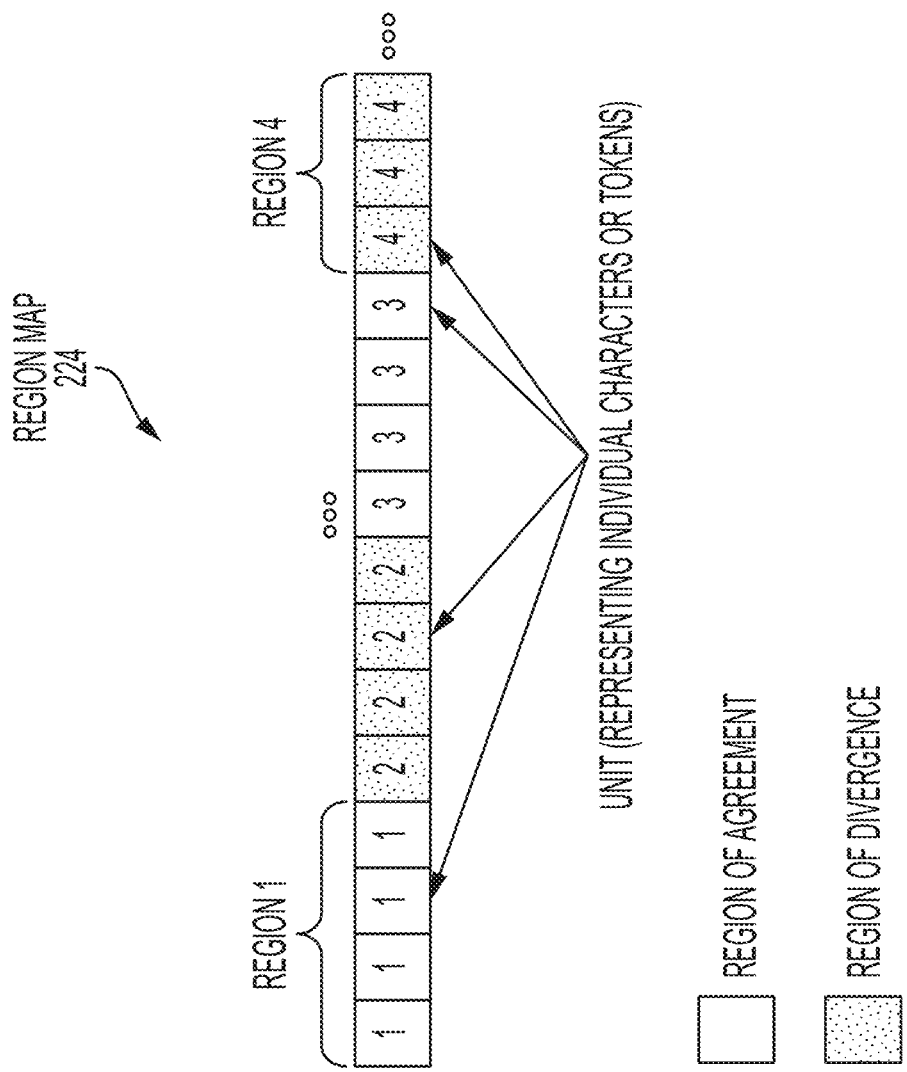
FIG. 5 depicts a block diagram of a displayed region map of regions of agreement and regions of divergence for a machine-generated document according to one or more embodiments of the present invention.

The software application 204 can be configured to determine regions of agreement and regions of divergence based at least in part on the comparison of the previous version of the machine-generated document 222_1 to the current version of the machine-generated document 222_1, where versions can be tracked in database 232. Software application 204 can generate a region map 224 of all the regions of agreement and regions of divergence for the machine-generated document 222_1, as depicted in FIG. 5. Region map 224 is generated and maintained for each unit of the reference version, which is the previous version of the machine-generated document 222_1. A unit can be a character and/or token in the machine-generated document 222_1. A character can be an individual letter and/or individual letters used to make a string. A token can be a word, a string a characters (like a variable name), keywords, etc. A token can also be a subword sequence of characters such as a syllable. Any unit for which there is an insertion or deletion in any pairwise comparison with the reference version is part of a region of divergence in region map 224. Any unit for which there are no insertion or deletions in any of the pairwise comparisons is part of a region of agreement in region map 224. In some implementations, small regions of agreement can be merged into adjoining regions of divergence, thereby becoming a region of divergence.

At block 306, the interactive editing tool 200 can perform or trigger software application 204 to identify a user edit as one or more user-replaced tokens of a previous token sequence based at least in part on the comparison. A multiple way difference comparison can be used to track multiple changes to the machine-generated document with divergent regions to identify edits. For instance, an edit can include a sequence of multiple tokens and edits can occur at multiple locations in the machine-generated document 222_1.

At block 308, the interactive editing tool 200 can perform or trigger software application 204 to generate a new version of the machine-generated document that includes the one or more user-replaced tokens and identifies one or more related tokens to replace with a suggested replacement token sequence associated with the one or more user-replaced tokens. The new version of the machine-generated document can be generated using autoregression to produce a next token based at least in part on one or more previous tokens generated up to a current location within the machine-generated document. For example, generation of the new version of the machine-generated document can be performed incrementally using the generative model 210. As an alternative, the new version of the machine-generated document can be generated using non-causal generation to search forward and backward from the one or more user-replaced tokens to identify the one or more related tokens to replace with the suggested replacement token sequence. This may use variable length masking of non-edited regions of the document. Retraining of a generative process may be needed for non-causal generation as changes are made.

At block 310, the interactive editing tool 200 can perform or trigger software application 204 to generate a suggestion list 228 for display to the user in a graphical user interface 206 to indicate the suggested replacement token sequence to replace the one or more related tokens.

At block 312, the interactive editing tool 200 can perform or trigger software application 204 to confirm user acceptance of replacement of individual portions of the new version of the machine-generated document from the suggestion list 228. The computer-implemented process 300 can continue to monitor for further edits after confirming user acceptance of the suggested replacement token sequence at one or more replacement locations in the new version of the machine-generated document and generate further suggested updates of the machine-generated document until the editing session is complete. The interactive editing tool 200 can perform or trigger creation of a new variation of the machine-generated document 222_1 that is subsequently generated by providing the accepted and rejected combinations of tokens to the generative model 210. For example, accepting suggestions may not lead to using the generative model 210 again, as the suggestions had already been predicted based on user edits. However, if one or more suggestions are rejected, then the non-predicted change can be interpreted as another user edit, which may result in suggested changes elsewhere within the machine-generated document 222_1. The user rejecting one or more changes from the suggestion list 228 can result in an alternate version of the machine-generated document being selected as the current state.

Software application 204 can be configured to display a region map 224 in conjunction with the machine-generated document 222_1 in a graphical user interface 206. In one or more embodiments, the user utilizing a mouse, keyboard, etc., can move a pointer or cursor to select (e.g., hover over, right click, etc.) an individual region of divergence from the region map 224 in order to view the display of a suggestion for that particular region in graphical user interface 206.

FIG. 5 illustrates how adjacent units can be combined by assigning them identical region numbers into individual regions of agreement or divergence, where divergence can represent a user edit or suggested change based on a user edit. In addition to displaying the alternative translation for the unit in a region on the display, software application 204 can be configured to display a link to another machine-generated document, for example, a new version of machine-generated document 222_1, a portion of the machine-generated document 222_1 in which a suggestion is located, a thumbnail of the machine-generated document 222_1, and/or an entirety of the machine-generated document 222_1 with the region clearly marked, highlighted, bolded, encircled, etc. As displayed in graphical user interface 206, software application 204 can be configured to display an option for the user to select the suggestion for the region in the machine-generated document 222_1 to be utilized in place of the region in the current version of the machine-generated document 222_1. In response to the user selecting the suggested change for the region in the machine-generated document 222_1, software application 204 can be configured to utilize the suggestion for the region in the machine-generated document 222_1 in a final version document 240 in place of the region in the current version of the machine-generated document 222_1.

Although only a few regions of divergence are illustrated in region map 224 for explanation purposes, region map 224 could have numerous regions of changes, and the graphical user interface 206 is configured to display the suggestions associated with a user edit for each of the divergent regions when the user selects a divergent region in region map 224 for display of the suggestions. The region map 224 can be used to construct the suggestion list 228, which is used by graphical user interface 206 to present results to the user, demarcating regions of divergence and presenting alternatives for those regions. Software application 204 can be configured to generate a suggestion list 228 for display to the user in graphical user interface 206, where suggestion list 228 can be a data structure of suggestions based at least in part on user-replaced tokens.

Figure 6:
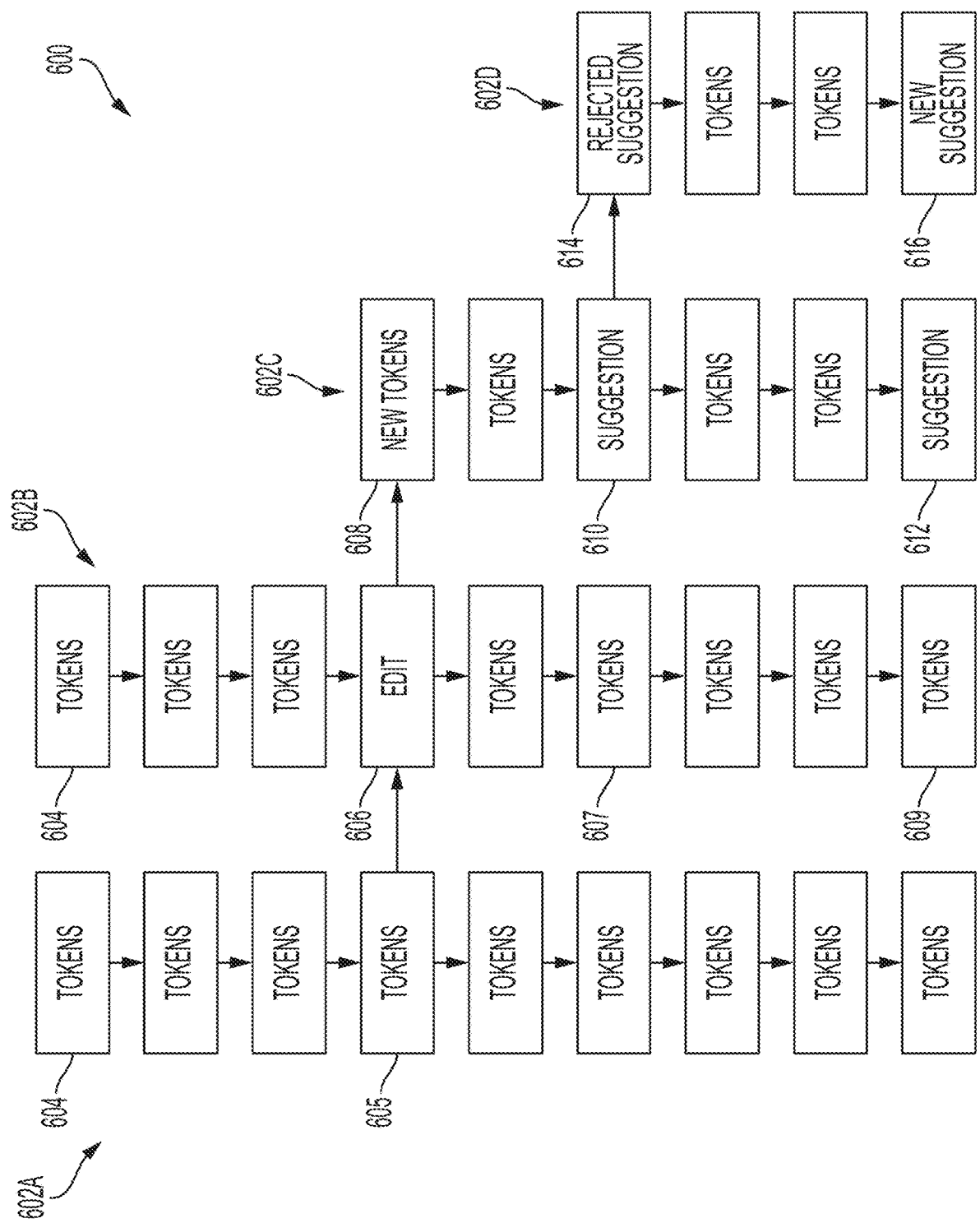
FIG. 6 depicts a block diagram of a token sequences of a machine-generated document according to one or more embodiments of the present invention.

FIG. 6 depicts display of an example of token sequences 600 of a machine-generated document in accordance with one or more embodiments. A machine-generated document can be generated with a first sequence of tokens 602A. Tokens 604 in the first sequence of tokens 602A may be unchanged by a user until reaching tokens 605. Upon the user making an edit 606, the first sequence of tokens 602A can become a previous version of the machine-generated document, and the edited version can be a second sequence of tokens 602B, which still includes the tokens 604 up to the edit 606 and subsequent tokens after the edit 606. A new version of the machine-generated document can be generated that includes the one or more user-replaced tokens 608 for the edit 606 and identifies one or more related tokens 607, 609 to replace with a suggested replacement token sequence 610, 612 associated with the one or more user-replaced tokens 608. A third sequence of tokens 602C includes the previous tokens from the second sequence of tokens 602B along with the one or more user-replaced tokens 608 and suggested replacement token sequence 610, 612. The current version of machine-generated document displayed to the user still appears based on the second sequence of tokens 602B. A suggestion list 228 can be generated for display to the user in a graphical user interface to indicate the suggested replacement token sequence 610, 612 for the user to accept or reject. If the suggested replacement token sequence 610, 612 is accepted, then the current version of the machine-generated document as displayed is based on the third sequence of tokens 602C in combination with the tokens 604 up to the region of change. If the user rejects one or more of the suggested replacement token sequence 610, 612, the rejection can be deemed a change that may generate a further analysis for new suggestions. For example, if the suggested replacement token sequence 610 is rejected, a fourth sequence of tokens 602D can include a rejected suggestion 614 and may result in a new suggestion 616 as an alternate suggested replacement token sequence at a subsequent position in the sequence. The rejected suggestion 614 may retain the original value of tokens 607 or can be an alternate user edit made in response to rejecting the suggested replacement token sequence 610. The new suggestion 616 may be displayed in the suggestion list 228 for the user to accept or reject. If the user accepts the new suggestion 616 then the current version of the machine-generated document as displayed will be updated based on the fourth sequence of tokens 602D in combination with the previous tokens leading up to the fourth sequence of tokens 602D. Although only a single edit is depicted in the example of FIG. 6, multiple edits can be performed and analyzed as multiple change regions with corresponding suggestion lists. Accepting or rejecting suggestions in a machine-generated document with multiple edits may trigger an update to subsequent suggestions.

FIG. 7 is a rendering of an example of graphical user interface 206 displaying machine-generated document 222_1, which can be a highest confidence translation of document 220 from a first programming language to a second programming language or a user-selected translation from among multiple translations. The user may navigate through the machine-generated document 222_1 using the interactive editing tool 200. Upon recognizing a translation error 702, such as use of a parameter in a loop structure, the user may edit the machine-generated document 222_1 to correct the translation error 702. Making a change to the machine-generated document 222_1 during the editing session can result in a state change such that a current state of the machine-generated document 222_1 includes one or more user-replaced tokens that replaced a previous sequence of tokens associated with the translation error 702. The version of the machine-generated document 222_1 that included the translation error 702 represents a previous state after the change is made. Version history can be tracked, for example, in database 232. Upon identifying the change, a new version of the machine-generated document 222 can be generated to determine other suggested changes based at least in part on the user-replaced token replacing the previous token associated with the translation error 702. The current version of the machine-generated document 222_1 without the new translations can continue to be displayed and used in case the user does not accept the suggestions. For example, FIG. 8 depicts a user edit 802 that changes the translation error 702 of "nums" in FIG. 7 to "range (len (nums))" in a looping structure.

FIG. 9 depicts a multiple version difference summary 230 of the machine-generated document 222_1 after performing an updated translation based at least in part on inclusion of the user-replaced token associated with the user edit 802. The graphical user interface 206 can display artificial intelligence (AI) comments and suggestions 902 with a list of identified user edits and suggested updates as an example of suggestion list 228. Locations 904 of the suggested updates can be highlighted or otherwise identified to assist the user in understanding the potential impact and scope of the changes. In the example of FIG. 9, changing "nums" to "range (len (nums))" results in a suggestion to change some instances of "i" within the looping structure to "num[i]". Note that the related tokens for "i" and replacement tokens for "num[i]" can be determined as a result of a translation with the user edit 802 incorporated and thus is not simply a find and replace operation, as the meaning of the tokens is understood by the generative model 210 to make suggestions that comply with language structure rules.

FIG. 10 depicts the final version 240 of the machine-generated document after user editing and update completing on graphical user interface 206 according to one or more embodiments. In FIG. 10, accepted suggestions 1002 are highlighted to illustrate that the user opted to accept the suggestions of FIG. 9 at locations 904 to change selected instances of "i" within the looping structure to "num[i]".

Although the example sequence of FIGS. 7-10 depicts an example of one change in one region of a machine-generated document, it will be understood that multiple edits in multiple regions of the machine-generated document can occur. Further, embodiments can be applied to many domains. For example, in a program translation context, changes to the originally generated translation, such as a data declaration or loop construct a might imply a difference in how data is subsequently referred to or accessed. In a text generation context, changes to the gender of a character could affect pronouns later in the text. Changes to the description of a character may suggest plot alterations. Employing the techniques as described herein in this context may use a low "temperature" (randomness) setting such that the system would regenerate the same text given the same prompt every time and suggestions can be solely due to edits to the prompt, and not to randomness in the generation process. Other uses can include natural language translations, generation of code from natural language descriptions, or any domain where the generated output of a model and the edited version of that output can be represented with a common encoding scheme. In some cases, textual representations of input or output (such as markup language for UIs, or SMILES for molecules) can serve as an intermediate representation that will enable a common encoding. Further, in image processing applications, changes and suggestions can be graphically determined and made. For instance, changing an eye color of one eye in an image can result in a suggestion to make the same change for a corresponding eye of an eye pair in the image.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, by an interactive editing tool executed by a processor, a machine-generated document that is generated by a generative model, the machine-generated document including a translation of a corpus in a programming language from a first representation to a second representation;
   performing, by the interactive editing tool executed by the processor, a comparison of a current state of the machine-generated document to a previous state of the machine-generated document, wherein the comparison of the current state of the machine-generated document to the previous state is during an editing session of the machine-generated document through the interactive editing tool;
   identifying, by the interactive editing tool executed by the processor, a user edit made to the machine-generated document as one or more user-replaced tokens of a previous token sequence in the machine-generated document based at least in part on the comparison;
   identifying, by the interactive editing tool executed by the processor, one or more related tokens appearing after the one or more user-replaced tokens in the previous token sequence, wherein the one or more related tokens are identified based on the translation including the user edit incorporated using the generative model configured with language structure rules for the translation;
   generating, by the interactive editing tool executed by the processor, or triggering generation, by an application, of a new version of the machine-generated document that includes the one or more user-replaced tokens and identifies the one or more related tokens to replace with a suggested replacement token sequence associated with the one or more user-replaced tokens;
   generating, by the interactive editing tool executed by the processor, a suggestion list for display to the user in a graphical user interface to indicate the suggested replacement token sequence to replace the one or more related tokens;
   outputting, by the interactive editing tool executed by the processor, the suggestion list in the graphical user interface during the editing session through the interactive editing tool;
   confirming, by the interactive editing tool executed by the processor, user acceptance of the suggested replacement token sequence at one or more replacement locations in the new version of the machine-generated document during the editing session;
   selecting, by the interactive editing tool executed by the processor, an alternate version of the machine-generated document as the current state based at least in part on the user rejecting one or more changes from the suggestion list during the editing session, to make the alternate version of the machine-generated document a basis for subsequent comparisons; and
   continuing to monitor, by the interactive editing tool executed by the processor, for further edits to the machine-generated document through the graphical user interface after confirming the user acceptance and generating further suggested updates of the machine-generated document until the editing session is complete, wherein the further suggested updates comprise an alternate suggested replacement sequence based on a user rejection of one or more of the further suggested updates during the editing session.

2. The computer-implemented method of claim 1, wherein the new version of the machine-generated document is generated using autoregression to produce a next token based at least in part on one or more previous tokens generated up to a current location within the machine-generated document.

3. The computer-implemented method of claim 1, further comprising performing a multiple way difference comparison to track multiple changes to the machine-generated documents to identify edits.

4. The computer-implemented method of claim 1, wherein the new version of the machine-generated document is generated using non-causal generation to search forward and backward from the one or more user-replaced tokens to replace the one or more related tokens with the suggested replacement token sequence associated with the one or more user-replaced tokens.

5. A computer system comprising:
   a memory having computer readable instructions; and
   one or more processors for executing the computer readable instructions of an interactive editing tool, the computer readable instructions configured to perform operations by the interactive editing tool comprising:
      receiving a machine-generated document that is generated by a generative model, the machine-generated document including a translation of a corpus in a programming language from a first representation to a second representation;
      performing a comparison of a current state of the machine-generated document to a previous state of the machine-generated document, wherein the comparison of the current state of the machine-generated document to the previous state is during an editing session of the machine-generated document through the interactive editing tool;
      identifying a user edit made to the machine-generated document as one or more user-replaced tokens of a previous token sequence in the machine-generated document based at least in part on the comparison;
      identifying one or more related tokens appearing after the one or more user-replaced tokens in the previous token sequence, wherein the one or more related tokens are identified based on the translation including the user edit incorporated using the generative model configured with language structure rules for the translation;
      generating or triggering generation, by an application, of a new version of the machine-generated document that includes the one or more user-replaced tokens and identifies the one or more related tokens to replace with a suggested replacement token sequence associated with the one or more user-replaced tokens;
      generating a suggestion list for display to the user in a graphical user interface to indicate the suggested replacement token sequence to replace the one or more related tokens;
      outputting the suggestion list in the graphical user interface during the editing session through the interactive editing tool;
      confirming user acceptance of the suggested replacement token sequence at one or more replacement locations in the new version of the machine-generated document during the editing session;
      selecting an alternate version of the machine-generated document as the current state based at least in part on the user rejecting one or more changes from the suggestion list during the editing session, to make the alternate version of the machine-generated document a basis for subsequent comparisons; and continuing to monitor for further edits to the machine-generated document through the graphical user interface after confirming the user acceptance and generating further suggested updates of the machine-generated document until the editing session is complete, wherein the further suggested updates comprise an alternate suggested replacement sequence based on a user rejection of one or more of the further suggested updates during the editing session.

6. The system of claim 5, wherein the new version of the machine-generated document is generated using autoregression to produce a next token based at least in part on one or more previous tokens generated up to a current location within the machine-generated document.

7. The system of claim 5, wherein the operations further comprise:

performing a multiple way difference comparison to track multiple changes to the machine-generated document to identify edits.

8. The system of claim 5, wherein the new version of the machine-generated document is generated using non-causal generation to search forward and backward from the one or more user-replaced tokens to replace the one or more related tokens with the suggested replacement token sequence associated with the one or more user-replaced tokens.

9. A computer program product comprising a computer readable storage medium having program instructions embodied therewith of an interactive editing tool, the program instructions executable by one or more processors and configured to perform operations by the interactive editing tool comprising:

receiving a machine-generated document that is generated by a generative model, the machine-generated document including a translation of a corpus in a programming language from a first representation to a second representation;

performing a comparison of a current state of the machine-generated document to a previous state of the machine-generated document, wherein the comparison of the current state of the machine-generated document to the previous state is during an editing session of the machine-generated document through the interactive editing tool;

identifying a user edit made to the machine-generated document as one or more user-replaced tokens of a previous token sequence in the machine-generated document based at least in part on the comparison;

identifying one or more related tokens appearing after the one or more user-replaced tokens in the previous token sequence, wherein the one or more related tokens are identified based on the translation including the user edit incorporated using the generative model configured with language structure rules for the translation;

generating or triggering generation, by an application, of a new version of the machine-generated document that includes the one or more user-replaced tokens and identifies the one or more related tokens to replace with a suggested replacement token sequence associated with the one or more user-replaced tokens;

generating a suggestion list for display to the user in a graphical user interface to indicate the suggested replacement token sequence to replace the one or more related tokens;

outputting the suggestion list in the graphical user interface during the editing session through the interactive editing tool;

confirming user acceptance of the suggested replacement token sequence at one or more replacement locations in the new version of the machine-generated document during the editing session;

selecting an alternate version of the machine-generated document as the current state based at least in part on the user rejecting one or more changes from the suggestion list during the editing session, to make the alternate version of the machine-generated document a basis for subsequent comparisons; and continuing to monitor for further edits to the machine-generated document through the graphical user interface after confirming the user acceptance and generating further suggested updates of the machine-generated document until the editing session is complete, wherein the further suggested updates comprise an alternate suggested replacement sequence based on a user rejection of one or more of the further suggested updates during the editing session.

10. The computer program product of claim 9, wherein the operations further comprise:

performing a multiple way difference comparison to track multiple versions of the machine-generated document with divergent region alternatives.

11. The computer program product of claim 9, wherein the new version of the machine-generated document is generated using autoregression to produce a next token based at least in part on one or more previous tokens generated up to a current location within the machine-generated document.

12. The computer program product of claim 9, wherein the new version of the machine-generated document is generated using non-causal generation to search forward and backward from the one or more user-replaced tokens to replace the one or more related tokens with the suggested replacement token sequence associated with the one or more user-replaced tokens.

\* \* \* \* \*